Oct. 27, 1964  J. J. HARRINGTON  3,153,890
BALER FEED STRUCTURE

Filed June 4, 1959  3 Sheets-Sheet 1

INVENTOR

Joseph J. Harrington

BY

ATTORNEYS

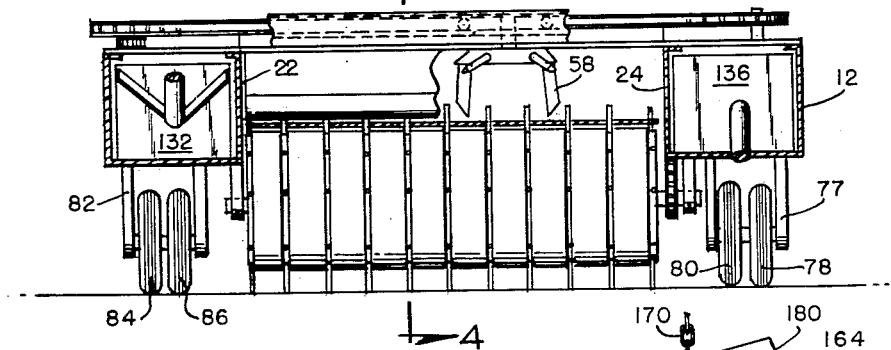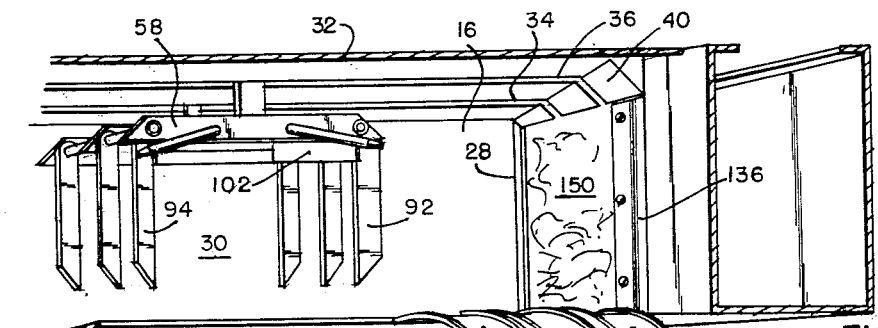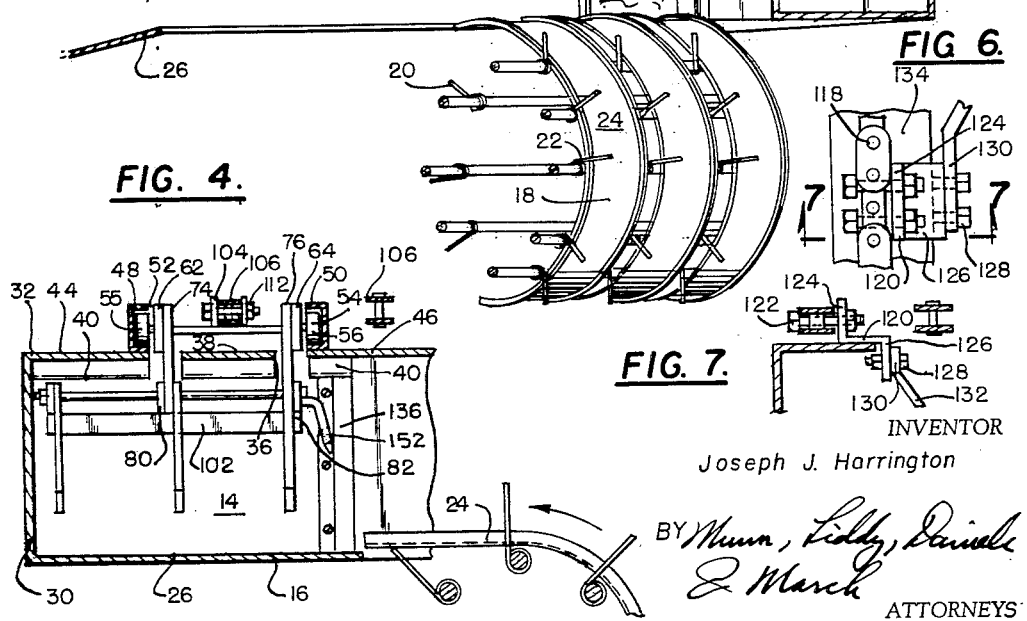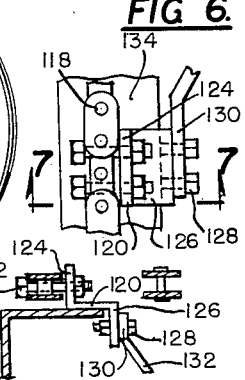

INVENTOR
Joseph J. Harrington

BY
ATTORNEYS

United States Patent Office 3,153,890
Patented Oct. 27, 1964

3,153,890
BALER FEED STRUCTURE
Joseph J. Harrington, Harrington Mfg. Co. Inc.,
Lewiston, N.C.
Filed June 4, 1959, Ser. No. 818,084
1 Claim. (Cl. 56—341)

This invention pertains to balers and particularly to a dual chamber hay baler and a hay feeding means therefor.

An object of the invention is to provide a dual chamber hay baler with a practical and efficient satisfactory feed means for feeding the hay into the two chambers.

Another object of the invention is to provide simple, reliable adequately strong feed means.

An additional object of the invention is to provide a means for feeding two bale chambers with a single feed device.

Yet another object of the invention is to provide a bale feeding device in cooperation with a pair of chambers which sweeps across a platform in alignment with pickup means so that there is an easy flow pattern of the hay up over the pickup means onto the platform and into the chambers.

Another object of the invention is to provide in a hay baler having a pair of bale pressing means and a single feed means for feeding both of the pressing means which feed means is correlated with the operation of the pressing means so as to provide maximum compact uniform bales and speed and smoothness of operation.

Yet another object of the invention is to provide a single feed device oscillatable between a pair of bale chambers, carrying fork like fingers for sweeping hay into the bale chambers, which will not interfere with the sweeping of the hay up onto a platform behind the hay pickup means, and yet which will adequately and completely pack the hay into the bale chambers.

A further object of the invention is to provide a single sweep device having means for sweeping the hay alternately into each of two bale chambers.

Still another object of the invention is to provide a suspended sweep means oscillatable over a platform between two bale chambers which contributes to strength and simplicity of construction of the baler.

Another object of the invention is to provide a simple drive means for the hay sweep structure.

Yet still another object of the invention is to provide a track mechnism for suspending the feed device between a pair of bale chambers so that the feed device can be easily and readily swept back and forth between the chambers.

Another object of the invention is to provide a track structure contributing to the strength of the baler and rigidly interconnecting the bale chambers for rigid long properly aligned continued operation of the sweep mechanism.

Yet a further object of the invention is to porvide a sweep mechanism comprising a single plate like member oscillatable between a pair of hay receiving chambers and means including pivoted prong like fingers depending therefrom and movable over a hay supporting platform which will be rigidly supported while moved in one direction and pivotal when moved in another direction to permit hay to pass under the fingers.

Still another object of the invention is to provide in a hay baler a hay platform, a feed device oscillatable over the platform laterally of the bale chamber and including pivoted fingers operable to sweep hay into the chamber on one stroke and on the return storke to pass over the hay together with means facilitating the depositing of the hay on the platform by a pickup means and yet insuring adequate full packing of the hay into the bale chamber.

Still another object of the invention is to provide a light yet rigid fork frame movable in a straight line motion and which is track supported and readily connectable to a drive means.

Yet another object of the invention is to provide suitable bearing structure providing easy operation and long life for the movable sweep means.

Still another object of the invention is to dispense with the usual arm type sweep mechanism and heavy oscillating structure heretofore employed in balers and provide instead an oscillating structure having a straight line motion. This reduces the weight, and power needed and results in a stronger more reliable feed means.

These and other objects and advantages of the invention will become apparent from the following description and the accompanying drawings wherein:

FIGURE 3 is an enlarged fragmentary perspective view taken in the general direction indicated by the line 3—3 of FIGURE 1.

FIGURE 4 is a sectional view taken along line 4—4 of FIGURE 1.

FIGURE 6 is a fragmentary enlargement of a portion of FIGURE 1.

FIGURE 7 is a side elevational view of the structure of FIGURE 6, along line 7—7.

FIGURE 8 is a sectional view taken along line 8—8 of FIGURE 2.

FIGURE 12 is a sectional view along 12—12 of FIGURE 1.

Figure 1:
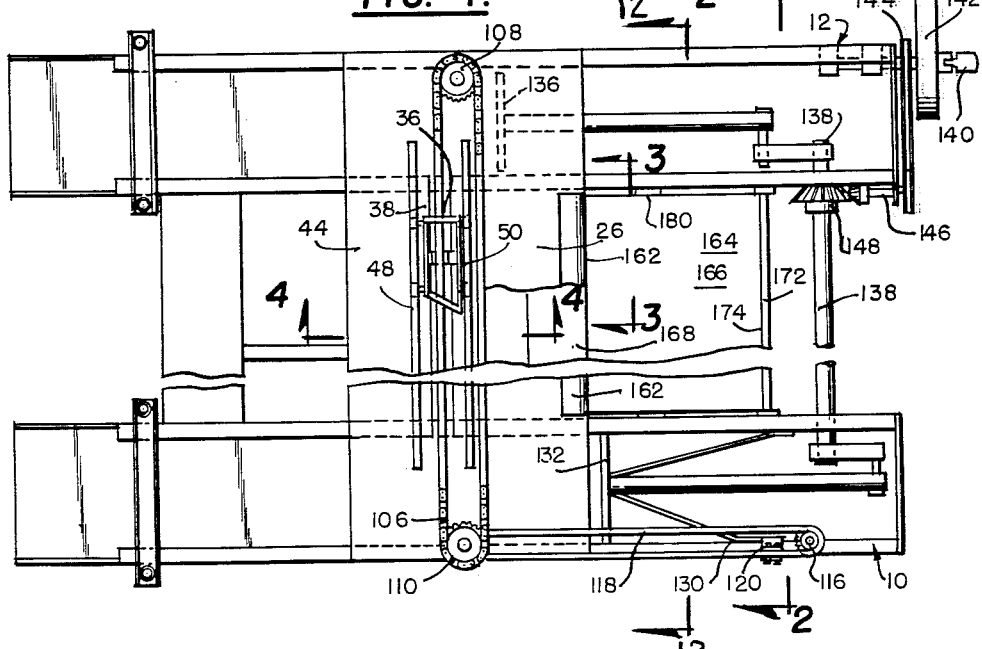
FIGURE 1 is a top plan view of a baler constructed in accordance with the invention.

The instant invention relates to the problem of providing for feed to a pair of parallel bale chambers in a dual chamber hay baler. The baler comprises a single pickup means with the bale compressing chambers spaced on each side of the pickup means. The invention contemplates placing a sweep platform and feed chamber to the rear of the pickup and means within the chamber operative to feed both bale compressors. According to the invention and in accomplishment of the objects thereof the bale chamber openings are spaced directly opposite each other and define the ends of the sweep chamber and platform, and a single feeding device is provided for sweeping the hay into both of the bale chamber openings. The invention further has the advantage of a single carriage mechanism for the sweep device.

Referring now in particular to the drawings:

A hay baler constructed in accordance with the instant invention comprises a pair of spaced parallel bale chambers 10 and 12 preferably of equal length and arranged with their ends opposite each other. Each of the bale chambers is of a common construction known in the art and they are provided intermediate their lengths with hay inlet openings 14. The hay inlet openings of each of the chambers are in facing relationship to each other and the bale chambers are connected adjacent their inlet openings by a hay sweep chamber 16. A hay pickup 18 also extends between the bale chambers. The pickup is of a known form and comprises fingers 20 which are preferably in the form of spring fingers mounted on bars 22. The fingers project outwardly between the sweep hoops 24. The latter are generally of a curved shape, concentric to the axis of the sweep mechanism, and at their upper ends merge into a platform 26. The platform 26 extends rearwardly substantially horizontally and laterally between the bale chambers. The platform is preferably positioned at a height substantially in alignment with the lower edge of the hay inlet openings 14 and extends approximately rearwardly to the rear edge 28 of the hay inlet. The platform provides the base of the sweep chamber and the sweep chamber has a rear wall 30 extending upwardly from the platform. The rear wall is substantially vertical and in alignment with the rear edge 28. Prior art hay baling machines have provided a knife edge along the rear edge 28 and a cooperating knife edge on the plunger head 136, but such knife edges, while preferred, are not absolutely necessary. The hay sweep chamber also has an upper wall 32. This extends substantially longitudinally parallel to the platform lower wall 26.

As is known in the art the pickup functions to bring the hay to the platform, which forms the lower wall of the sweep chamber, and moves it toward and against the rear wall 30. Obviously means must be provided to sweep the hay from this sweep chamber platform into the two baling chambers.

Referring particularly to FIGURES 1 and 3:

The upper wall of the sweep chamber has a pair of spaced parallel slots 34, 36 extending longitudinally therealong and dividing the wall into three sections. The central section 38 is preferably formed by a plate secured to the opposed bale chambers. Adjacent each hay inlet each of the upper wall sections can be provided with a downwardly sloping plate 40 which serves to bevel the upper wall of the chamber downwardly into alignment with the top of the bale inlet opening. The upper wall 32 preferably extends across the top of the bale chambers and the hay inlet openings are spaced downwardly beneath the tops sufficiently to provide room for structural members. However, it is apparent that such is not necessary and that the partition like members forming the upper wall 32 can be connected directly in alignment with the upper edge of the bale chamber inlet openings. The partition members forming the outer sections of the upper wall 32 are formed by plates 44, 46 substantially flush with the top of the chamber. Plate 44 extends outwardly to the edge of the bale chamber and is secured to both the outer and inner chamber sides.

A pair of spaced opposed track forming members 48 and 50 are provided. Each track member is adjacent one of the slots 34, 36 and extends parallel thereto. The tracks extend over the top of the bale chambers and are secured to the plates 44 and 46 forming part of the framing of the latter chamber. Each of these track forming members are formed of channels and they provide facing trackways 52 and 54 respectively. These trackways are adapted to supportingly receive spaced rollers 55, 56 on opposite sides of the sweep device 58.

The sweep device comprises a frame 60. The latter has spaced parallel side frame members 62, 64 in the form of vertical bars. Each of these side frame members has spaced openings for receiving the axles 66 of ball bearing rollers 55, 56. Nuts 68 are used to secure the axles in position. The rollers are preferably mounted one adjacent each end of each of the side frame members. Note that side frame member 62 is of shorter length than the member 64. However, this is not essential to the invention.

The side frame members are interconnected at their ends by lateral brace members 70 and 72. Each of the side frame members has a depending plate 74, 76 oppositely positioned with respect to each other and the latter are connected by a cross brace 78. At their lower ends each of the plates 74 and 76 are connected to feed finger frame plates 80 and 82 respectively. A third feed finger plate 84 is connected to plate 80 by cross brace 86. The three plates 80, 82 and 84 are substantially equally spaced from each other and parallel to the upper plates forming the side frame members 62 and 64. The plates 80 and 82 are respectively beneath the latter two plates. Plates 80, 82 and 84 are connected adjacent their ends by laterally extending axles 88 and 90. A pair of feed finger assemblies 92 and 94 are respectively pivotally supported on these axles. Each of the assemblies comprise vertically positioned feed fingers 95, 96, 98 preferably formed of straight flat stock. The fingers are provided with pointed, tapered lower ends 100. Each of the feed fingers further comprise a thrust brace 102 which rigidly interconnects the fingers and serves as a stop limiting the pivoting movement of the feed finger assemblies inwardly of the sweep device. (See FIGURE 3.) This stop is positioned relative to the feed finger frame plate so as to provide a slight outward slant of the feed fingers with respect to the laterally spaced axles above these fingers.

Viewing FIGURE 3: the feed finger assembly to the right can pivot counter clockwise and the feed finger assembly to the left of the sweep device can pivot clockwise out of the positions in which they are illustrated but they cannot pivot inwardly of the sweep device toward each other below that device.

The sweep device is adapted to be moved in an oscillatory motion from one side of the sweep platform to the other while supported in the tracks. As the device is moved to the right, as viewed in FIGURE 3, the assembly 92 to the right of the sweep device will urge hay through the opening 14. When the sweep device moves back toward the left the right hand feed finger assembly can pivot upwardly over the hay and will not then sweep the hay before it. It should be further noted that the feed finger frame plates 80, 82 and 84 are positioned beneath the upper wall 32 a distance such that they are beneath the upper edge of the hay inlet opening in the bale chambers. Also the depending plates 74 and 76 are positioned substantially longitudinally centrally of the sweep device. As a result the plates 80, 82, 84 and the connected feed assemblies can be moved into the bale chambers to thoroughly pack hay within said chambers. This insures hay reaching the side of the bale chambers opposite the inlet openings.

It will be noted from FIGURE 4 that the rear side of the sweep device extends beneath the plate 44 and thus the whole sweep chamber is thoroughly swept by the sweep device.

Figure 2:
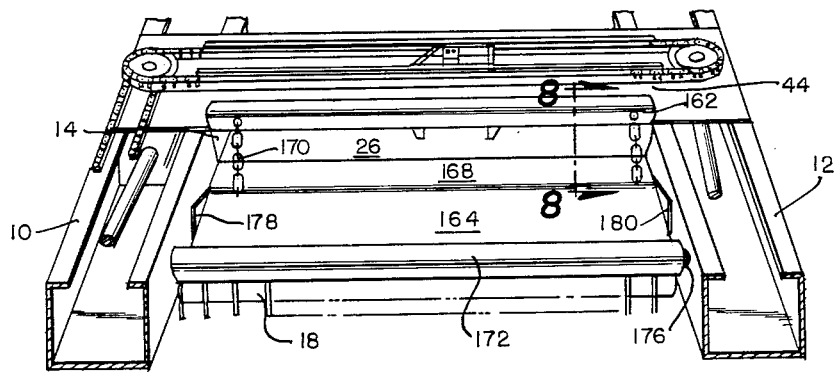
FIGURE 2 is a fragmentary perspective view taken in the general direction indicated by the line 2—2 of FIGURE 1.
Figure 5:
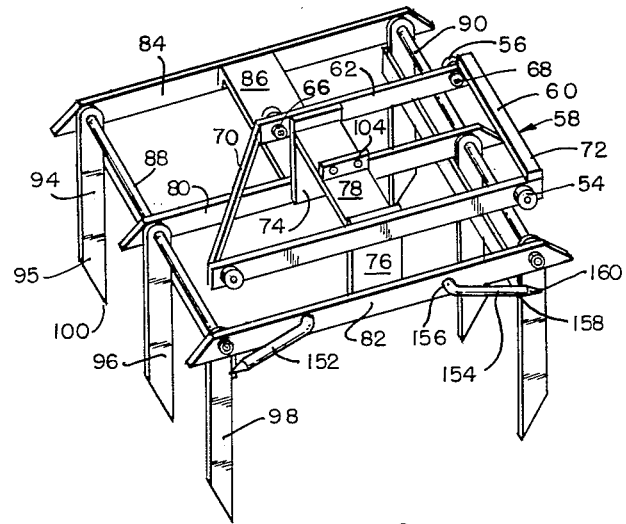
FIGURE 5 is an enlarged perspective view of the sweep fork mechanism illustrated in FIGURE 4.

The sweep device is adapted to be driven by the following structure (referring particularly to FIGURES 1, 2 and 5): The sweep frame cross brace 78 is provided with a vertically upstanding attachment piece 104. Drive chain 106 is supported at its ends on a pair of sprockets 108 and 110 freely rotatably mounted on the opposed bale chambers respectively. One of the drive chains passes directly parallel and adjacent to the attachment piece 104 and is adapted to be adjustably connected to the latter by spaced bolts 112. A sprocket is fixed attached beneath the sprocket 110 and a fourth sprocket 116 is rotatably supported adjacent the front of the baler. All of the sprockets are suitably rotatably mounted on axles affixed to the chamber. A second chain 118 is passed around sprocket 116 and the aforesaid sprocket, which is beneath sprocket 110.

Referring now particularly to FIGURES 1, 6 and 7:

It is seen that chain 118 is attached to a bracket 120 by means of spaced bolts passing between the chain rollers and secured in a flange 124 of the bracket 120. The bracket has a downwardly depending flange 126. This is fixed by a bolt 128 to a portion of the framing 130 of the plunger head 132. The bracket 120 is supported on the chain and the chain is in turn supported by the sprocket so that the bracket clears the frame member 134 of the bale chamber. It is apparent that the point of connection of the two chains can be adjusted relative to the respective bracket 120 and the sweep device 58.

Thus the relative position of the sweep device with respect to the plunger head can be adjusted. It is apparent also that as the plunger head in the bale chamber 10 moves in and out, in alternate compression and retraction strokes, the interconnected chains oscillate back and forth and the sweep frame accordingly sweeps back and forth. It is apparent that by using the proper gearing ratios that the sweep can be made to sweep back and forth in timed relationship with the plunger head 132.

It is further noted that the plunger head 136 is connected to a shaft 138 and the latter shaft is also connected to the plunger head 132. The interconnections are through suitable cranks and pitmans. Further the shaft 138 is adapted to be driven by a power takeoff connection 140. The latter is in turn connected to flywheel 142 and sprocket 144. The latter is connected to shaft 146 and shaft 146 is drivingly connected to shaft 138 by suitable gear means 148. The two plunger heads are connected to shaft 138 so that they are 180 degrees out of position with respect to each other and thus one plunger will be at its maximum retraction position when the other is at its maximum compression stroke position.

As will be apparent from an inspection of the drawings the result is that the sweep device sweeps back and forth through the sweep chamber to force hay into the bale chamber past the plunger heads when the latter uncover their hay inlets. While one plunger head sweeps forwardly to compress the hay, as illustrated in FIGURE 3, the sweep device is moving away from the corresponding chamber toward the opposite chamber. FIGURE 3 illustrates the hay 150 being compressed in the chamber 12 by the head 136 as the sweep mechanism moves to the left. It is understood of course that the hay is constantly being brought up onto the platform but this has not been shown in the figures.

The sweep device elements 80, 82 and 84 will project inwardly of the bale chambers when the plunger heads are withdrawn to effect maximum induction of hay into the chambers.

The sweep mechanism further comprises a pair of horn like fingers 152 and 154. These fingers comprise oppositely extending cylindrical members having a base leg 156 secured to the feed finger frame plate 82 on opposite sides of the depending plate 76. Each of the feed fingers further comprises a leg 158 extending downwardly forwardly of the plate 82. In the vertical plane these legs 152 describe angles of about 30 degrees with the horizontal. They each terminate in pointed ends 160 at a point approximately below the shafts 88 and 90 respectively. These horn like members project outwardly over the platform and forwardly to a point spaced slightly rearwardly of the forward edge of the hay inlet openings of the baler chambers. They will catch hay and sweep it toward these chambers as they are moved respectively towards their facing chambers. They will however permit the hay to be readily moved upwardly on the platform past these horn like fingers. It is found that this construction does not interfere with the movement of hay up onto the platform and yet sweeps the outermost edge of the latter.

According to the instant invention the top wall of the hay sweep chamber extends forwardly of the chamber over the platform and terminates in a forward upwardly curving guide flange 162. (See FIGURE 2.) A hold-down sheet 164 also extends from a point substantially forward of the pickup to a point rearwardly of the forward edge of the platform beneath the upper wall 32. The hold-down sheet is seen to comprise a forward plate portion 166 and a rearward plate portion 168. The latter extends at an obtuse angle downwardly from the upper surface of the plate 166. At the juncture of the two plates a pair of support chains 170 extends upwardly and connect to the guide flange 162. The support chains adjustably limit the downward movement of the rear plate 168 over the sweep platform. At its forward edge the plate 164 curves upwardly to form a fender 172. This is secured to a shaft 174 by welding or other suitable means and the ends of the shaft are rotatably mounted within bearings 176 attached to the baling chambers. A pair of side guide flanges 178 and 180 extend upwardly along the sides of the hold-down adjacent the meeting line between the two plate portions. These tend to center the hold-down plate and guide it in pivotal movement in the bearings 176. The plate shaft is free to rotate in these bearings.

Figure 9:
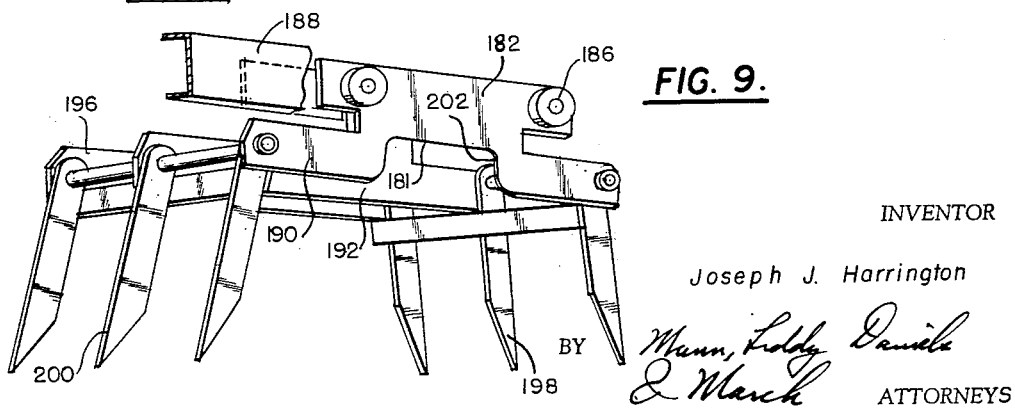
FIGURE 9 is a fragmentary perspective view of a baler showing another form of sweep device constructed in accordance with the invention.
Figure 10:
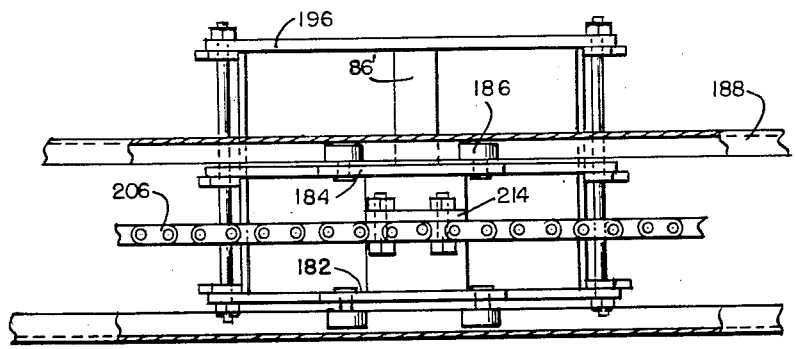
FIGURE 10 is a top plan view thereof.

FIGURES 9 and 10 illustrate a second form of sweep mechanism constructed in accordance with the invention. In this form of the invention the sweep device comprises a frame 181. The frame has parallel side plate 182 and 184. The support rollers 186 are adapted to be received in the track 188. Finger plates 190 and 192 are connected to the bottoms of the side plates 182 and 184. A third plate 196 extends parallel to the plates 190 and 192. Plate 196 is connected to plate 190 by a cross member 86′ similar to member 86—see FIGURE 5. The feed finger assemblies 198 and 200 are pivotally mounted on shafts supported in the plates 190, 192 and 196. The finger plate 190 is split to provide a central opening 202. This opening facilitates the movement of the hay up onto the platform. The frame 181 is provided with a center plate 214 which is attached to the chain 206.

It is to be noted that the plates 190, 192 and 196 are spaced beneath the bottom of the top wall of the hay sweep chamber and beneath the top of the hay inlet openings. Thus the finger assemblies can move inwardly of the bale chambers.

Figure 11:
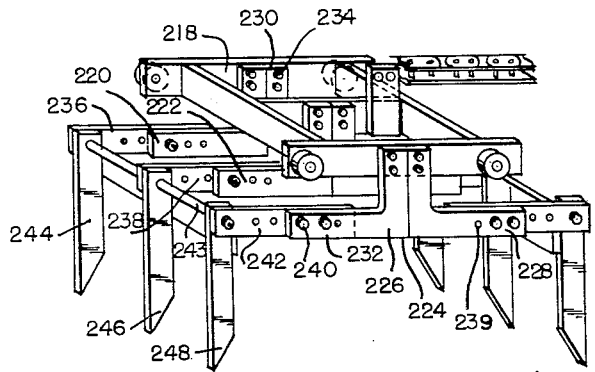
FIGURE 11 is a perspective view of a third form of sweep device constructed in accordance with the invention.

FIGURE 11 shows a third form of sweep device. However, as will be apparent from the following description, FIGURE 11 actually also shows a manner in which the forms of sweep device illustrated in FIGURES 4, 5, and 9 and 10 may be modified.

Referring now to the FIGURE 11: The sweep device comprises a frame 218. Feed finger frame plate 220, 222 and 224 are attached to frame 218. These plates in this form of the invention are formed in two parts, namely: left and right members 226 and 228. These members are identically formed and comprise L-shaped brackets having upper legs 230 and longitudinally extending legs 232. The latter are adapted to extend substantially horizontally over the hay platform. The identical brackets are adapted to be butted back to back and attached to the frame 218 by removable fastening means; preferably nuts and bolts 234.

The horizontal legs are provided with a series of spaced openings 239 and these are adapted to receive nuts and bolts such as 240. The sweep further comprises spaced finger frame extensions 236, 238 and 242. These have openings corresponding to openings 239 and are adapted to be placed in side by side relationship with the plates 220, 222 and 224 and to be secured thereto by means of the nuts and bolts 240. It is apparent that by this construction the members 236, 238 and 242 can be adjusted lengthwise along the horizontal legs 232 of the brackets. At their outer ends the extensions are provided with aligned openings for receiving axle 243, and the feed fingers 244, 246 and 248 are pivotally mounted on these axles. The construction at one side of the sweep frame is identical with that at the opposite side.

The legs 232 and the extension 236 depend downwardly beneath the frame so that they may readily move into the hay inlet openings in the sides of the bale chambers while the frame ends move over the top of the latter. This insures that the feed fingers will force the hay thoroughly over to the sides of the baler chambers opposite the inlet openings.

It is obvious that the brackets 226 and 228 can be detached from the frame. Further the extensions can obviously be detached from the brackets. The advantage of this type of construction is that it makes it possible to continue baling operations even though one bale chamber should fail. For example, assume that a knotter or a needle breaks then it would be obviously undesirable to continue baling with the chamber associated with the broken elements. The sweep device if allowed to continue in the normal manner however would continue to sweep hay into that chamber. However, although the hay will be compressed in this chamber, it will not be tied. As a result it will just drop out loosely behind the bale chamber. Obviously this will make it necessary to go over the hay again in order to bale it, and this is undesirable. With a double chamber baler having the construction illustrated in FIGURE 11 it is possible to continue baling with the same speed and efficiency as is possible with a single chamber baler. The operator need merely to detach the brackets on the side of the sweep facing the defective bale chamber and then continue his baling operation. With the brackets on one side detached no hay will be swept into the corresponding chamber. As a result it is not necessary to stop baling operations entirely when there is a breakdown. Baling operations can be continued with at least the same speed as is possible with a single chamber baler. This is another advantage of the instant baler. Obviously it provides a reserve factor in the event of mechanical failure. With heretofore known balers on such a failure although the labor must still be paid the equipment is put entirely out of service until repaired. With this apparatus however it is possible to make repairs on off hours.

It is apparent that the type of construction shown in FIGURE 11 can be readily adapted to the other forms of sweep devices illustrated and that the feed finger frame plates of the latter can be sectionalized and attached to the frame by bolts or other suitable means so that they can be readily detached by the operator with wrenches.

While I have shown and described a preferred form of my invention, it will be understood that variations in details of form may be made without departure from the invention as defined in the appended claim.

I claim:

A hay baling machine comprising;

(a) a pair of baling chambers spaced apart in substantially parallel relationship, (b) each of said baling chambers having hay inlet openings, the inlet opening of each chamber facing the inlet opening of the other chamber, (c) a hay receiving platform extending between each baling chamber and interconnecting said baling chambers adjacent each of said inlet openings, (d) a pickup means adapted to pick up hay from the ground and deliver it to said platform, (e) a sweep device which is adapted to sweep hay deposited upon said platform alternately toward one inlet opening and then toward the other inlet opening, (f) said sweep device containing groups of feed fingers, (g) a frame to which said groups of feed fingers are attached, (h) track means to movably support said frame.

(i) reciprocating drive means for alternately moving said frame and attached fingers first toward one inlet opening and then toward the other inlet opening, (j) said feed fingers being mounted on said frame in such a manner that one group of fingers is adapted to pivot upwardly in a clockwise direction when the sweep device is moving in one direction and another group of fingers is adapted to pivot upwardly in a counterclockwise direction when the sweep device is moving in the opposite direction.

References Cited in the file of this patent

UNITED STATES PATENTS

| | | |
|---|---|---|
| 405,034 | Hooton et al. | June 11, 1889 |
| 1,627,327 | Hickman | May 3, 1927 |
| 2,389,193 | Graves | Nov. 20, 1945 |
| 2,487,938 | Nikkel | Nov. 15, 1949 |
| 2,545,188 | Baskerville | Mar. 13, 1951 |
| 2,647,355 | Luke | Aug. 4, 1953 |
| 2,720,073 | Freeman et al. | Oct. 11, 1955 |
| 2,757,602 | Nolt | Aug. 7, 1956 |
| 2,948,101 | Long | Aug. 9, 1960 |
| 2,950,670 | Nolt et al. | Aug. 30, 1960 |
| 3,040,508 | Nolt et al. | June 26, 1962 |

FOREIGN PATENTS

| | | |
|---|---|---|
| 347,769 | Germany | Jan. 26, 1922 |